United States Patent [19]
Cudmore

[11] 3,794,351
[45] Feb. 26, 1974

[54] VELOCIPEDE
[76] Inventor: Patrick Cudmore, 9 Fallon St., Cambridge, Mass. 02138
[22] Filed: Apr. 24, 1972
[21] Appl. No.: 246,727

[52] U.S. Cl. ............ 280/204, D34/15 AL, 280/282
[51] Int. Cl............................................ B62k 17/00
[58] Field of Search ... 280/200, 204, 263, 262, 261, 280/282; 34/15 AL, 15 AJ

[56] References Cited
UNITED STATES PATENTS

| | | | |
|---|---|---|---|
| 1,375,459 | 4/1921 | Hesse | 280/204 UX |
| 2,166,767 | 7/1939 | Petermann | 280/11.22 |
| 827,012 | 7/1906 | Grove | 280/263 |
| 2,812,031 | 12/1957 | Aghnides | 180/27 |
| 2,787,970 | 4/1957 | Bennett | 280/259 X |
| 1,797,713 | 3/1931 | Brozelli | 280/DIG. 007 |
| 3,671,055 | 6/1972 | Aarup | 280/87.04 A |

FOREIGN PATENTS OR APPLICATIONS
801,891  1/1951  Germany ............................. 280/263

Primary Examiner—Kenneth H. Betts
Assistant Examiner—J. M. McCormack
Attorney, Agent, or Firm—Chittick, Thompson & Pfund

[57] ABSTRACT

A velocipede having a tractor unit and a detachable semi-trailer unit. The tractor unit includes a front wheel, cranks and foot pedals to drive the front wheel, and a fork and a handlebar to steer the front wheel. The semi-trailer includes a very wide single rear wheel which is shaped like a bulging barrel, and a molded plastic frame which supports the rear wheel and detachably engages the tractor unit fork. The frame has an integral seat formed thereon.

The velocipede is self-stabilizing because its center of gravity (including the rider) is located substantially below the rotational axis of a cone formed in part by the curvature of the rear wheel tread. Therefore, the velocipede is stable like a tricycle at rest and handles like a bicycle when ridden. Furthermore, additional trailer units can be coupled together to form a train behind a single tractor unit.

9 Claims, 5 Drawing Figures

PATENTED FEB 26 1974 3,794,351
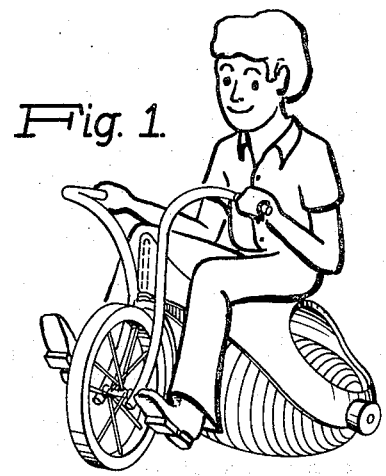
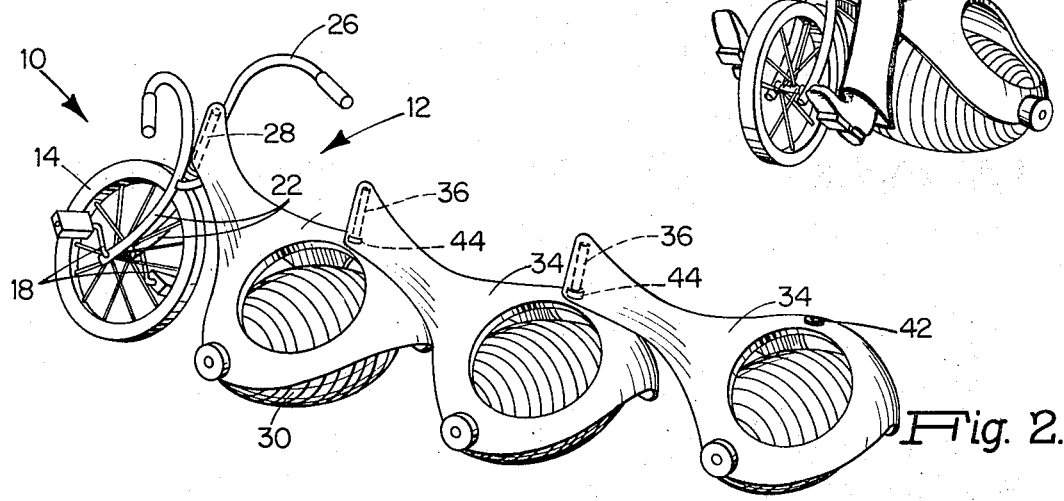
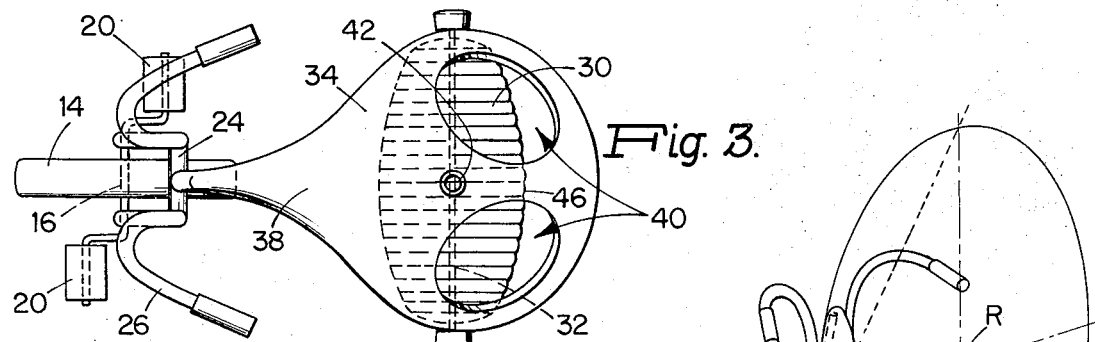
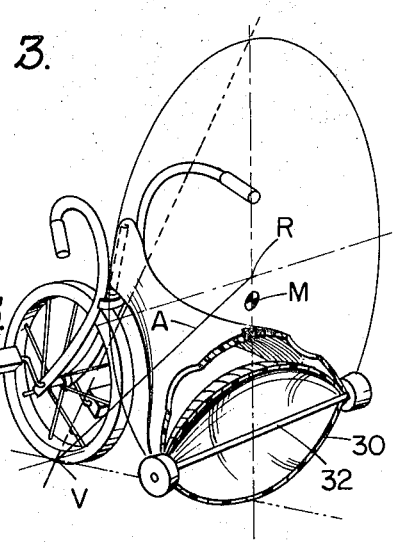
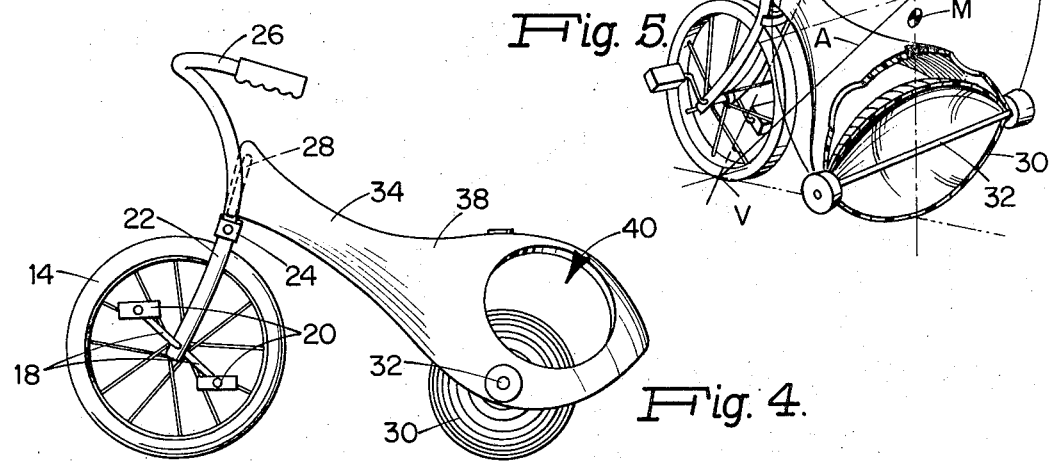

VELOCIPEDE

BACKGROUND OF THE INVENTION

A small child typically rides a tricycle when he is quite small and then advances to a bicycle when he is considerably older and larger. In order to make the marked transition between the tricycle and the bicycle, the child frequently fastens what are commonly called training wheels onto his bicycle.

Training wheels provide the bicycle with the stability of a tricycle while permitting the child to develop familiarity with the bicycle itself. However, training wheels have one major drawback. They prevent the bicycle from being steered by leaning in the direction of the turn and force the bicycle to be steered like a tricycle. This prevents the child from learning and developing the balance and motor coordination skills he will need in order to ride and steer a bicycle.

It is an object of this invention to provide a velocipede which has the stability of a tricycle and also has the capability of being ridden and steered like a bicycle.

It is another object of this invention to provide a velocipede which can be quickly disassembled into two units: a tractor unit and a semi-trailer unit; and has a hitch on the trailer so that a tractor can pull a number of trailers which are coupled together in train fashion.

SUMMARY OF THE INVENTION

This invention includes a conventional forward portion of a tricycle including a front wheel, foot pedals, a fork attached to the front wheel and a handlebar mounted on the upper end of the fork for steering the front wheel. The velocipede of this invention also includes a single rear wheel which is preferably barrel-shaped and quite wide. A one-piece frame links the rear wheel to the fork and provides an integral seat for the rider.

The frame is detachable from the fork and a hitch is provided on the frame so that a number of frame and rear wheel units can be coupled together to form a train behind a conventional forward portion.

The rear wheel is preferably barrel-shaped which permits the velocipede to be ridden like a bicycle while having the stability of a tricycle.

DESCRIPTION OF THE DRAWINGS

FIG. 1 is a perspective view of the velocipede of this invention with a child rider seated thereon;

FIG. 2 is a perspective view of the velocipede shown in FIG. 1 with two semi-trailer units hitched thereto to form a train;

FIG. 3 is a plan view of the velocipede;

FIG. 4 is a side elevation view of the velocipede; and

FIG. 5 is a perspective view of the velocipede with an imaginary cone superimposed thereon and with the rear wheel and frame cut away by the cone base.

DESCRIPTION OF THE PREFERRED EMBODIMENT

FIG. 1 shows the velocipede of this invention and a child seated on the velocipede. The velocipede is ridden like a bicycle while having the stability characteristics of a tricycle.

Referring now to FIGS. 2–4, the velocipede is comprised basically of a tractor unit 10 and a semi-trailer unit 12. The tractor unit 10 has a front wheel 14, a front axle 16, opposed cranks 18, and foot pedals 20. The foot pedals are revolved in circles to turn the cranks which rotate the front axle to drive the front wheel.

A fork 22 is affixed at its lower bifurcated portion to front axle 16 and is joined at its upper portion by a crossbar 24. Mounted on the upper portion of fork 22 is handlebar 26 which is adapted to be pivoted to steer front wheel 14.

Thus far, the description of tractor unit 10 has been analogous to that of the conventional front end of a tricycle. Additionally, the tractor unit 10 has an upstanding post 28 extending from the fork crossbar 24 which serves a purpose to be described below.

The semi-trailer unit 12 has a single rear wheel 30 and a rear axle 32. The rear axle 32 is journalled in a frame 34 which also has a downwardly opening recess 36 into which fork post 28 loosely fits. Thus, front wheel 14 can be easily steered by rotating handlebar 26 which rotates fork post 28 within frame recess 36.

The frame 34 is preferably a one-piece molded plastic element which is shaped somewhat like a large saddle having an integral seat 38 for the rider provided in its upper surface. Frame 34 is preferably molded with a pair of cut-out openings formed in its rearward portion for the purpose of saving weight and material. Also, openings 40 and the nut caps on axle 32 may be utilized as alternative foot rests by another child standing behind the rider or by another child riding on a pulled semitrailer unit (see FIG. 2) who places his feet in the openings 40 or on the nut caps of the preceding semi-trailer unit.

Frame 34 is also provided with a hitch 42 located in its rearward portion. The hitch is used in forming the velocipede train shown in FIG. 2. Hitch 42 can take many forms, but in the shown preferred embodiment it is simply a circular cut-out in the frame. The hitch cut-out is best shown in FIG. 3.

Frame 34 is also molded with a resilient ring-like flange 44 which extends below frame recess 36. Thus, when flange 44 of one semi-trailer is inserted downwardly into the slightly smaller circular cut-out portion of hitch 42 of another semi-trailer, said one semi-trailer becomes pivotally hitched to said another semi-trailer whereby the train shown in FIG. 2 can be formed (either with or without child riders on the pulled semi-trailers).

Although the precise form of the pivotal attachment means engaging the frame 34 to fork post 28, and the frame 34 to the frame of the preceding semi-trailer unit, is not critical to this invention, said pivotal attachment means must be quick and easy to engage and disengage while permitting a complete pivoting action between the linked elements.

The rear wheel 30 of this velocipede is an important factor contributing to the successful operation of this velocipede. Preferably, rear wheel 30 includes a pneumatic tire, either inflated to a low pressure or being of the type commonly referred to as "zero pressure". The tread 46 of rear wheel 30 preferably has a corrugated profile (as shown in FIG. 3) which reduces rolling friction when the velocipede is on hard pavement and increases support and traction when the velocipede is on grass, sand or uneven surfaces.

It is the function of rear wheel 30 to provide the velocipede of this invention with the stable characteristics of a tricycle. It is also the function of rear wheel 30 to provide the velocipede with the steering and turning characteristics of a bicycle. This combination of functions is produced by forming rear wheel 30 in a bulging barrel shape (see FIG. 5) wherein its axial dimension, or tread width, is preferably greater than the wheel diameter. The rear wheel shown in the drawings is approximately twice as wide as its diameter. This wheel configuration permits the velocipede to lean in the direction of its turn like a bicycle, while resisting tipping while at rest like a tricycle.

The curvature of the tread 46 should have its center of rotation R located quite high above the frame 34. As shown in FIG. 5, an imaginary circle drawn through the lower tread portion of rear wheel 30 forms the base of an imaginary cone having its vertex V at the point where the front wheel 14 rests on the ground, and having its rotational axis A running from vertex V to the center of rotation R. It will be understood that when the velocipede shown in FIG. 5 is leaned in either direction, it acts as if it were a cone rolling on its rotational axis A.

In order for the velocipede to be stable like a tricycle, the center of mass M of the combination of the velocipede and a typical child rider seated thereon must fall at all times within the half of the cone below the rotational axis A so that as the velocipede leans in one direction, the center of mass M always exerts a counteracting force urging the velocipede in the opposite direction. Of course, the tread 46 must be wide enough to prevent typical lateral displacements of the center of mass M from causing the velocipede to tip over.

Thus, it will be understood that in order for the velocipede to steer like a bicycle and be stable like a tricycle it must have a wide rear tire tread which is curved enough to permit leaning into turns, yet has a sufficiently shallow curve so that its center of curvature remains above the center of mass of the combined velocipede and its rider. Too much tread curvature impairs stability. Not enough tread curvature prevents leaning into turns.

In operation, a small child rides the velocipede of this invention by simply seating himself upon upper surface 38 of frame 34 with his feet positioned on pedals 20. At rest, the child cannot normally tip the velocipede over because the center of mass M is below the axis of rotation A and tends to exert a counteracting force in the direction opposite to that of the leaning velocipede. When the velocipede is ridden, it acts like a bicycle and is steered by leaning in the direction of the desired turn.

Furthermore, when it is desired to form a train, one velocipede is left as a complete vehicle while one or more other velocipede are disassembled into their two major groups, the tractor and the semi-trailer. Then, each semi-trailer frame 34 is pivotally attached to the semi-trailer in front of it by inserting its frame flange 44 into hitch 42. By this arrangement, a train is formed.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:
1. A velocipede which has the steering characteristics of a bicycle and the stability characteristics of a tricycle comprising:
   a. a front wheel having an axle;
   b. opposed cranks provided at the ends of said front wheel axle and foot pedals mounted on the ends of said cranks for driving said axle;
   c. a bifurcated fork having an upstanding steering post, said fork being affixed at its lower portions to the ends of said front wheel axle;
   d. a handlebar mounted on the upper portion of said fork for steering said front wheel;
   e. a single rear wheel having an axle, said rear wheel having an axial dimension which is greater than its diameter and having a bulging barrel shaped tread which permits said wheel to be leaned laterally into the direction of a turn;
   f. a frame pivotally attached at its forward portion to said steering post and at its rearward portion to said rear wheel axle, said frame having a rider support surface located at its intermediate portion; and
   g. the center of mass of a combination of said velocipede and a typical child rider seated on said velocipede, being located below the rotational axis of an imaginary cone having its vertex at the point where said front wheel engages the ground, having its sloping surface coincident with the ground, and having a peripheral portion of its circular base coincident with said barrel shaped tread of said rear wheel, whereby as the child rider leans the velocipede laterally on its rear wheel, the gravitational force on the center of mass counteracts the leaning motion to stabilize the velocipede.

2. The velocipede of claim 1 wherein the axial dimension of said rear wheel is greater than the distance between the two extreme lateral points to which a typical child rider can reposition the center of mass of the combined velocipede and typical child rider by leaning under normal conditions.

3. The velocipede of claim 1 wherein said rear wheel tread has a corrugated ground engaging surface with the ridges and grooves running in parallel planes normal to said rear wheel axle.

4. The velocipede of claim 1 wherein said rear wheel is a pneumatic tire.

5. The velocipede of claim 1 wherein said frame has a hitch means at its rearward portion, said hitch means being adapted to engage the forward portion of the frame of another velocipede in order to form a train wherein one complete velocipede pulls one or more single wheeled velocipede frames.

6. The velocipede of claim 1 wherein said frame has weight-saving cut-out portions formed therein which are also adapted to function as foot rests.

7. The velocipede of claim 1 wherein said frame has an integral saddle-shaped rider support surface formed on its upper portion.

8. The velocipede of claim 1 wherein said frame is of one piece molded plastic construction.

9. The velocipede of claim 1 wherein said rear wheel axle has outboard nut caps mounted at its ends which are also adapted to function as foot rests.

* * * * *

UNITED STATES PATENT OFFICE
CERTIFICATE OF CORRECTION

Patent No. 3,794,351      Dated February 26, 1974

Inventor(s) Patrick Cudmore

It is certified that error appears in the above-identified patent and that said Letters Patent are hereby corrected as shown below:

Column 3, line 11, after the word "tricycle.", insert the following sentence --The term "bulging barrel shape" means an ellipsoid with or without truncated flat ends.--

Column 3, line 21, cancel "on" and insert --about--

Column 3, line 53, cancel "velocipede" and insert --velocipedes--

Signed and sealed this 13th day of August 1974.

(SEAL)
Attest:

McCOY M. GIBSON, JR.                C. MARSHALL DANN
Attesting Officer                   Commissioner of Patents